(12) United States Patent
Surakanti et al.

(10) Patent No.: US 11,755,428 B2
(45) Date of Patent: Sep. 12, 2023

(54) BACKUP AND RECOVERY OF APPLICATION DATA OF AN APPLICATION EXECUTING IN A VIRTUAL MACHINE

(71) Applicant: NetApp Inc., San Jose, CA (US)

(72) Inventors: Priyanka Kasinath Surakanti, Sunnyvale, CA (US); Pratik Murali, Sunnyvale, CA (US); Ramanathan Padinjarel Somanathan, Fremont, CA (US); Vasantha Sadananda Prabhu, Bangalore (IN)

(73) Assignee: NetApp, Inc., San Jose, CA (US)

( * ) Notice: Subject to any disclaimer, the term of this patent is extended or adjusted under 35 U.S.C. 154(b) by 12 days.

(21) Appl. No.: 17/479,133

(22) Filed: Sep. 20, 2021

(65) Prior Publication Data

US 2022/0004467 A1      Jan. 6, 2022

Related U.S. Application Data

(63) Continuation of application No. 16/264,942, filed on Feb. 1, 2019, now Pat. No. 11,126,510, which is a continuation of application No. 15/219,384, filed on Jul. 26, 2016, now abandoned.

(51) Int. Cl.
*G06F 11/00* (2006.01)
*G06F 11/14* (2006.01)
*G06F 9/455* (2018.01)
*G06F 9/445* (2018.01)

(52) U.S. Cl.
CPC ...... *G06F 11/1469* (2013.01); *G06F 9/45558* (2013.01); *G06F 11/1451* (2013.01); *G06F 9/44526* (2013.01); *G06F 2009/45579* (2013.01); *G06F 2201/805* (2013.01); *G06F 2201/815* (2013.01); *G06F 2201/85* (2013.01)

(58) Field of Classification Search
CPC ............ G06F 11/1469; G06F 11/1451; G06F 9/45558
See application file for complete search history.

(56) References Cited

U.S. PATENT DOCUMENTS 7,805,565 B1      9/2010   Milligan et al.
8,874,954 B1 *  10/2014   Gupte ................. G06F 11/2033
                                                                            714/4.11

(Continued)

*Primary Examiner* — Philip Guyton
(74) *Attorney, Agent, or Firm* — COOPER LEGAL GROUP, LLC

(57) ABSTRACT

Backup of application data associated with an application executing in a virtual machine managed by a hypervisor is performed. Backup of the application data includes retrieving a Logical Unit Number (LUN) identification (ID) used by the application to store the application data in a storage volume. Backup of the application data also includes performing a virtual storage resolution for the LUN ID to determine whether the application data is stored in the storage volume identified by the LUN ID based on a first virtual mapping or a physical mapping. Backup also includes storing in metadata for the backup the LUN ID and whether the LUN ID is based on the first virtual mapping or the physical mapping. Backup includes creating a backup of the application data stored in the storage volume. Application data can subsequently be restored based on the application data that is backed up.

37 Claims, 5 Drawing Sheets

(56) References Cited

U.S. PATENT DOCUMENTS

| | | | |
|---|---|---|---|
| 9,026,500 B1 * | 5/2015 | vonThenen | G06F 11/1469 |
| | | | 707/679 |
| 9,389,800 B1 | 7/2016 | Natanzon et al. | |
| 9,652,265 B1 | 5/2017 | Narayanasamy et al. | |
| 9,658,925 B1 | 5/2017 | Damodharan et al. | |
| 10,114,706 B1 | 10/2018 | Chougala et al. | |
| 11,126,510 B2 * | 9/2021 | Surakanti | G06F 9/45558 |
| 2002/0053009 A1 | 5/2002 | Selkirk et al. | |
| 2009/0216816 A1 | 8/2009 | Basler et al. | |
| 2012/0109958 A1 | 5/2012 | Thakur et al. | |
| 2013/0262801 A1 | 10/2013 | Sancheti et al. | |
| 2014/0325116 A1 | 10/2014 | McKelvie et al. | |
| 2017/0285488 A1 | 6/2017 | Kamarasamy et al. | |
| 2022/0004467 A1 * | 1/2022 | Surakanti | G06F 11/1469 |

* cited by examiner

BACKUP AND RECOVERY OF APPLICATION DATA OF AN APPLICATION EXECUTING IN A VIRTUAL MACHINE

RELATED APPLICATIONS

This application claims priority to and is a continuation of U.S. application Ser. No. 16/264,942, filed on Feb. 1, 2019, now allowed and titled "BACKUP AND RECOVERY OF APPLICATION DATA OF AN APPLICATION EXECUTING IN A VIRTUAL MACHINE," which claims priority to and is a continuation of U.S. application Ser. No. 15/219,384, filed on Jul. 26, 2016 and titled "BACKUP AND RECOVERY OF APPLICATION DATA OF AN APPLICATION EXECUTING IN A VIRTUAL MACHINE," which are incorporated herein by reference.

BACKGROUND

The disclosure generally relates to the field of data processing, and more particularly to backup and recovery of application data for applications executing in a virtual machine.

Virtualization is driving higher resource use and is making provisioning new systems simple and cost effective. As a result, the number of virtual machines continues to grow. A virtual machine is a software implementation of a physical machine (e.g., a computer). A virtual machine includes virtual hardware devices that provide a same functionality as the physical machine. A virtual machine can also enable multiple operating systems to execute on a same physical machine simultaneously. Each of the operating systems can be providing services to its own set of applications or computer programs.

BRIEF DESCRIPTION OF THE DRAWINGS

Embodiments of the disclosure may be better understood by referencing the accompanying drawings.

DESCRIPTION

Figure 1:
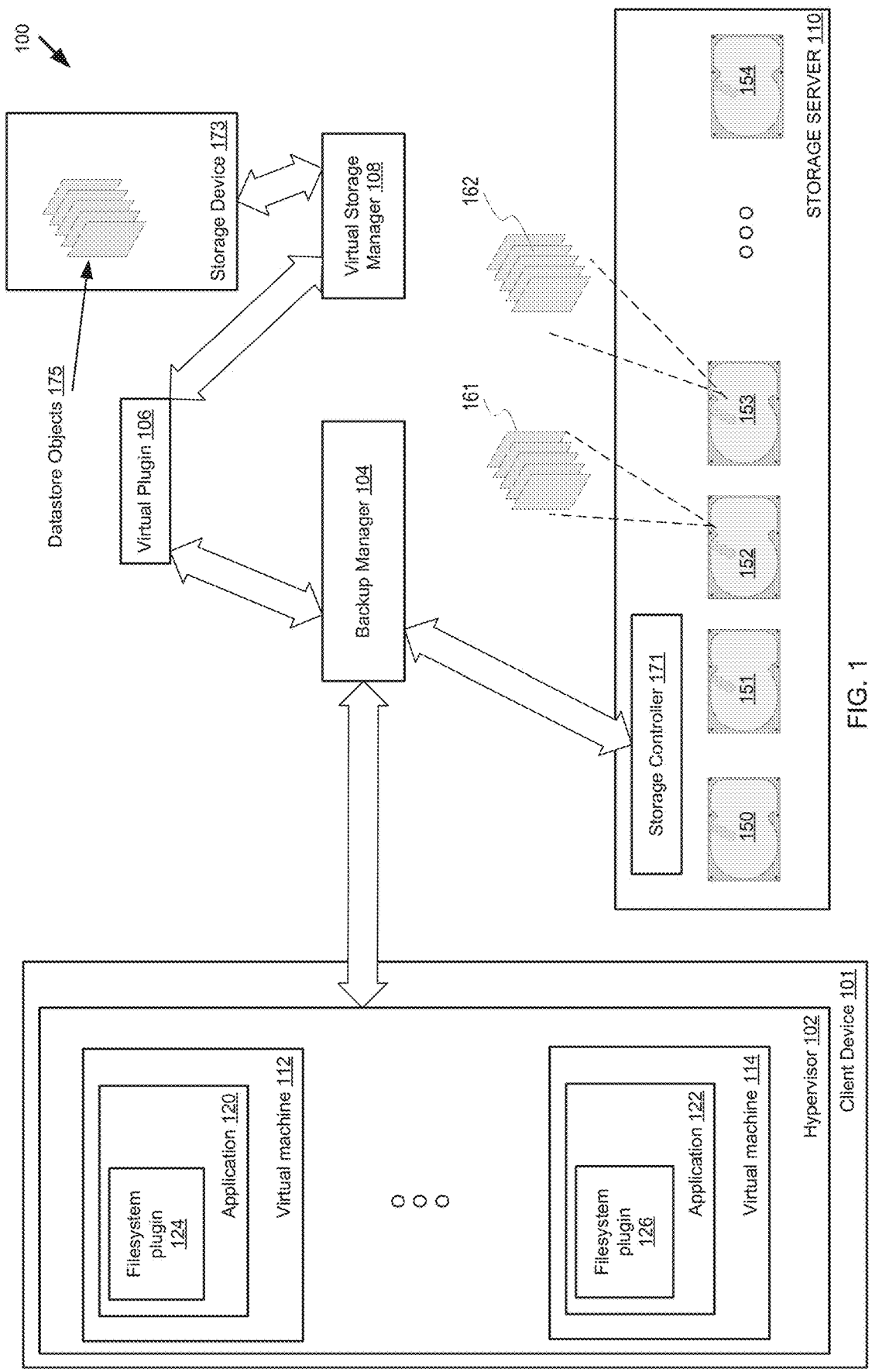
FIG. 1 depicts an example system having backup capture and recovery of data for an application(s) executing in a virtual machine, according to some embodiments.

The description that follows includes example systems, methods, techniques, and program flows that embody aspects of the disclosure. However, it is understood that this disclosure may be practiced without these specific details. For instance, this disclosure refers to certain physical to virtual address mappings (e.g., Raw Device Mapping (RDM)) in illustrative examples. But aspects of this disclosure can be applied to other types of physical to virtual address mappings. In other instances, well-known instruction instances, protocols, structures and techniques have not been shown in detail in order not to obfuscate the description.

Overview

Embodiments include backup and recovery of application data for applications executing on a virtual machine. In some embodiments, backups do not include a backup of all data for a virtual machine generally. Rather, backups can be specific to a particular application executing in a virtual machine. The applications can be different types of programs, software code, executables, etc. (e.g., database applications). Also, various types of virtual to physical storage mappings can be used for storage of the application data from a virtual machine. In particular, a virtual machine can access (e.g., read or write) physical storage using different types of virtual to physical mappings. Examples of these mappings include Raw Device Mapping (RDM), Virtual Machine Disk (VMDK), etc. These mappings redirect a virtual disk access to a physical storage address. Accordingly, a Storage Area Network (SAN) Logical Unit Number (LUN) can be connected to a virtual machine using such mappings. Some embodiments provide a uniform approach for backup and recovery of the application data for applications executing in a virtual machine regardless of the type of mapping.

Because virtual addressing is used by the applications within a virtual machine, the underlying physical storage topology (e.g., the physical storage addresses) can change over time. Therefore, the underlying physical storage topology for data related to an application executing in a virtual machine needs to be discovered using the virtual to physical mappings. Based on this topology, a backup of the application data then can be captured and subsequently used for recovery of the application. Accordingly, some embodiments provide for a recovery of an application (executing in a virtual machine) to a previously valid state. For example, recovery can return the state of an application to a point in time prior to some data corruption event. A recovery of an application can be independent of any restart or recovery of the virtual machine itself. Thus, in accordance with some embodiments, backup of application data of an application executing in a virtual machine does not require backup of data for the virtual machine itself (e.g., various metadata for a virtual machine). Furthermore, each application has its own mapping (e.g., RDM, VMDK, etc.). Accordingly, application data for each application can be separately backed up and recovered.

Terminology

This description uses the term "virtual machine" to refer to any software implementation or emulation of a physical machine (e.g., a computer). A virtual machine can create its own operating environment (e.g. operating system). A virtual machine can share hardware resources with other virtual machines using a hypervisor. The hypervisor provides for the sharing and managing of hardware resources among virtual machines. The hypervisor allows these different operating environments to be isolated from each other.

This description uses the term "virtual disk" to refer to any type of virtual storage. For example, a virtual disk can be a virtual drive, a logical disk, a logical drive, any type of virtual storage device that represents one or more physical disks.

This description uses the term "backup" to refer to any type of copying and archiving or saving of data. A backup can then be used to restore the data back to the point in time after any type of data loss event, data corruption event, etc. The backup can include an entire copy of all data, any related metadata, etc. In some instances, the backup can be just a snapshot in which just the changes to the data (since a previous backup) are saved in a copy. In other words, the backup can be a snapshot in which only incremental changes relative to a base copy of the data are copied (instead of all data).

This description uses the term "application" to refer to any type of program, code, executable, instructions, etc. During application execution, application data can be created and saved to storage. Example applications include database applications, word processing applications, spreadsheet applications, etc. Application data can include any data that is generated, derived from or related to the application. For example, for a database application, the application data can include the data that is stored, updated, etc.

Example System Architecture

FIG. 1 depicts an example system having backup capture and recovery of data for an application(s) executing in a virtual machine, according to some embodiments. A system 100 of FIG. 1 includes a client device 101, a backup manager 104, a virtual plugin 106, a virtual storage manager 108, a storage server 110, and a storage device 173. The client device 101 is communicatively coupled to the backup manager 104. The backup manager 104 is also communicatively coupled to the virtual plugin 106. The virtual plugin 106 is communicatively coupled to the virtual storage manager 108. The virtual storage manager 108 is also communicatively coupled to the storage device 173. At least some of the components in the system 100 can be executing in a same device. For example, the virtual plugin 106, the virtual storage manager 108, and the storage device 173 can be in a same storage server or other device.

The backup manager 104 is also communicatively coupled to the storage server 110, which includes a storage controller 171 and a number of storage devices 150-154. The storage devices 150-154 is configured to store the application data and backups of application data (as further described below). The backup manager 104 can create, update, etc., data in the storage devices 150-154 via the storage controller 171. In this example, the storage device 152 stores application data 161, and the storage device 153 stores a backup 162 of the application data 161.

The client device 101 includes a hypervisor 102 that manages and monitors one or more virtual machines. In this example, the hypervisor 102 includes management of a virtual machine 112 and a virtual machine 114. An application 120 is executing in the virtual machine 112, and an application 122 is executing in the virtual machine 114. The applications 120-122 can be different types of programs or software configured to perform different tasks. For example, the applications 120-122 can be database applications to read and write data from storage. For instance, each of the applications 120-122 can generate application data that is stored in and read from the storage server 110. As further described below, a snapshot of the application data can be captured and stored in the storage server 110. The snapshot of the application data is then used to recover the application. For instance, the snapshot can be used to return the application to a previous state defined by a previous version of the application data. The application 120 includes a filesystem plugin 124, and the application 122 includes a filesystem plugin 126. As further described below, the filesystem plugins 124-126 provide functionality to their respective applications 120-122 to allow for backup and recovery of application data related to their respective applications 120-122.

The backup manager 104 provides data protection and clone management for applications executing in virtual machines in hypervisor(s) executable in client device(s). In the example depicted in FIG. 1, there is one client device with one hypervisor managing two virtual machines, wherein an application is executing in each of the two virtual machines. However, some embodiments provide data protection and clone management for multiple applications executing in any number of virtual machines in hypervisor(s) executable in one or more client devices.

The virtual storage manager 108 provides for virtual storage management of data storage of virtual machines executing in multiple hypervisors. The multiple hypervisors can be executing in different client devices. The virtual storage manager 108 provides for virtual storage management through data containers called datastore objects 175 stored in the storage device 173. As further described below, at least some of the datastore objects 175 are mapped to volumes or LUNs in the storage server 110. At least some of the datastore objects 175 are also used to store metadata for the virtual machine(s) and the hypervisor(s).

The virtual plugin 106 is a plugin into the virtual storage manager 108 to provide for backup and recovery of application data for one or more applications across one or more virtual machines. The virtual plugin 106 provides an interface between the backup manager 104 and the virtual storage manager 108.

Example Backup Workflow

Figure 2:
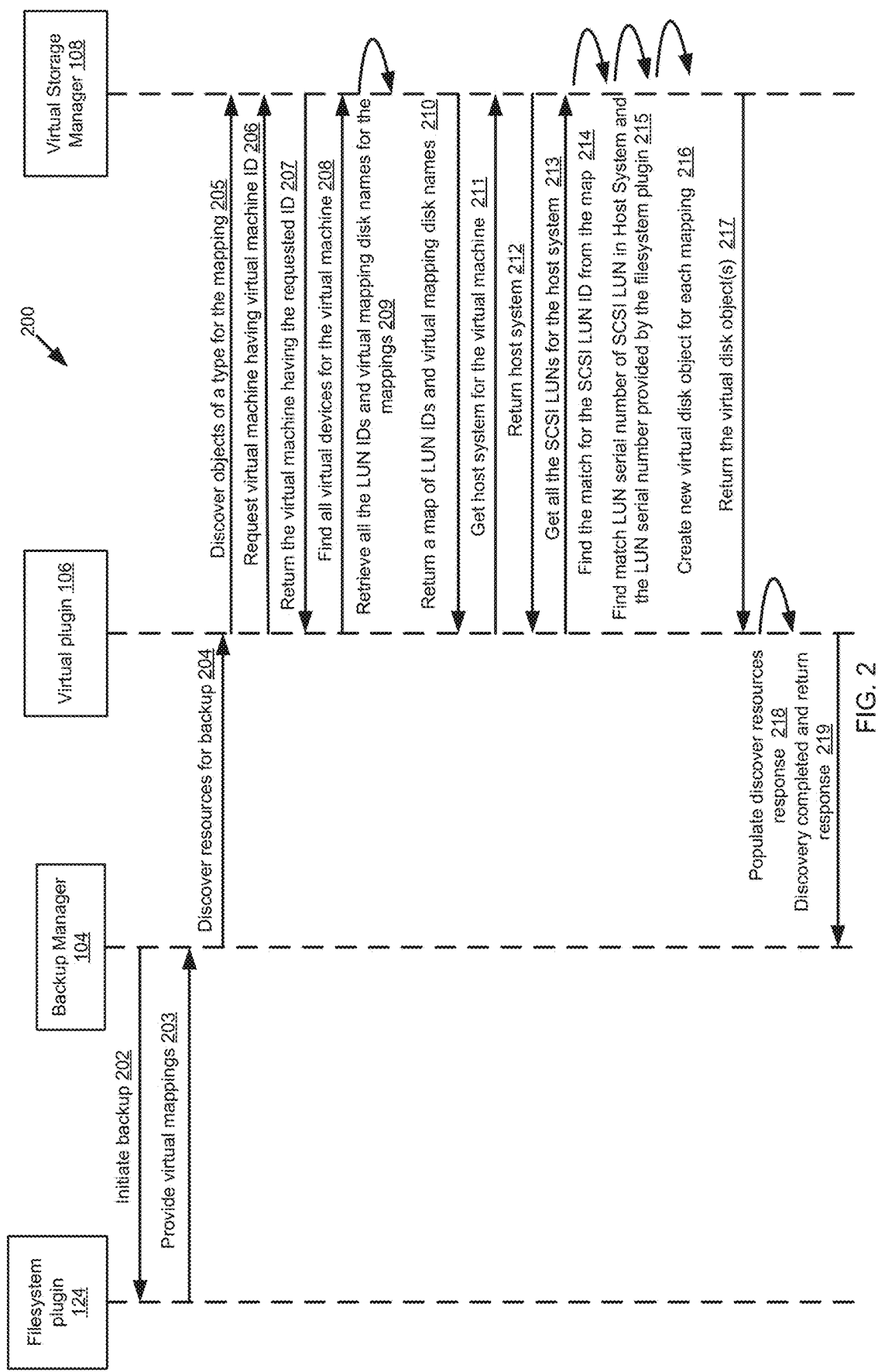
FIG. 2 depicts an example workflow diagram for backup of application data in a virtual machine, according to some embodiments.

FIG. 2 depicts an example workflow diagram for backup of application data in a virtual machine, according to some embodiments. A workflow 200 is described with reference to FIG. 1. For the workflow 200, an example (referenced as the current example below) is described such that application data for the application 120 is backed up. The workflow 200 depicts requests, responses, operations, etc. between and within the filesystem plugin 124, the backup manager 104, the virtual plugin 106, and the virtual storage manager 108. Operations of the workflow 200 can be performed by software, firmware, hardware or a combination thereof. The operations of the workflow 200 start at 202.

At 202, the backup manager 104 initiates a backup of application data of an application executing in a virtual machine by transmitting a request to initiate back to the client device 101. The request to initiate the backup can include identification of the application to be backed up and the virtual machine on which the application is executing. The backup can be for one or more applications. For the current example, the backup is of application data for the application 120 executing in the virtual machine 112. The hypervisor 102 can receive the request from the backup manager 104. The hypervisor 102 can then forward the request to the filesystem plugin 124.

At 203, in response to initiating the backup at 202, the filesystem plugin 124 returns to the backup manager 104 one or more types of mappings (e.g., RDM, VMDK, physical, etc.) that have been to store the application data. The filesystem used by the application 120 can be residing on one or more of these different types of mappings. If the type of mapping is VMDK, the filesystem plugin 124 also returns a unique identifier (e.g., VMDK serial number) for this particular mapping relative to other VMDK mappings used to store data in the storage server 110. If the type of mapping is RDM or a physical mapping, the filesystem plugin 124 returns the LUN ID. The LUN ID could be either the LUN ID for the particular RDM or the physical LUN ID for the physical mapping. In some embodiments, the filesystem plugin 124 is not able to resolve whether the LUN ID is for RDM or a physical mapping. Also, the backup manager 104 is also not able to resolve the VMDK mappings. Rather, these resolutions are performed by the virtual plugin 106 and virtual storage manager 108 has further described below (see 219 below). The application data can have one or more mappings that are the same or different. For example, mappings for the application data can include multiple LUN IDs (wherein each LUN ID is an RDM or a physical mapping) and multiple VMDK identifiers (wherein each VMDK identifier is for a different VMDK). Each VMDK identifier can be a Universally Unique Identifier (UUID) within the system 100 of FIG. 1. For instance, for a database application, the data is stored using VMDK while the log files are stored using RDM or physical mappings. In another instance, for a database application, one database is stored using VMDK while a different database is stored using RDM.

At 204, the backup manager 104 transmits a request to the virtual plugin 106 to discover resources for the backup. In particular, the backup manager 104 transmits a request to the virtual plugin 106 to obtain virtual storage resolution for the mappings for the application data that is being backed up. The request can include the VMDK identifiers (e.g., VMDK serial number) for any VMDK mappings and the LUN IDs for any RDM mappings or physical mappings. As further described below, the virtual plugin 106 can also resolve whether a LUN ID is for an RDM or a physical mapping. If a LUN ID is for a physical mapping, the virtual plugin 106 can return a response to the backup manager 104 that this particular LUN ID is a physical mapping and no virtual storage resolution is needed for this particular LUN ID.

At 205, in response to the request at 204, the virtual plugin 106 transmits a request to the virtual storage manager 108 to discover objects for the particular mappings (e.g., VMDK, RDM, etc.) received from the backup manager 104. The virtual storage manager 108 discovers the storage mapping in the storage layer for each of the mappings received. For example, the virtual storage manager 108 discovers the datastore object that corresponds to the VMDK serial number for each of the VMDK mappings. Similarly, the virtual storage manager 108 also discovers the datastore object that corresponds to the LUN ID for each of the RDM mappings. With reference to FIG. 1, the virtual storage manager 108 can discover or locate the datastore object for each of the VMDK and RDM mapping from among the datastore objects 175 stored in the storage device 173. The virtual storage manager 108 can discover or locate the datastore objects based on the VMDK serial number for VMDK mappings and LUN ID for the RDM mappings. The datastore objects for virtual disks are storage containers which are backed by LUNs stored in the storage server 110. The datastore object for VMDK mappings includes the underlying storage location/information. For example, the datastore object for VMDK mappings include the volume and LUN where the data is stored in the storage server 110. The datastore objects for RDM mappings include a mapping that points to the RDM LUN in physical storage (e.g., SAN storage).

At 206, also in response to the request at 204, the virtual plugin 106 transmits a request for the virtual machine having the application whose application data is being backed up. The request includes an identification of the virtual machine. The identification of the virtual machine can be an alphanumeric value that uniquely represents the virtual machine among virtual machines having resources that are stored in the storage server 110. The request can include an identification of the virtual machine. In the example for FIG. 1, the virtual plugin 106 includes an identification of the virtual machine 112.

At 207, in response to the request at 206, the virtual storage manager 108 returns the virtual machine having the requested ID. For example, the virtual storage manager 108 retrieves a datastore object that corresponds to the virtual machine based in its ID. For example, the virtual storage manager 108 retrieves one of the datastore objects 175 from the storage device 173 that corresponds to the virtual machine based in its ID. The datastore object that corresponds to the virtual machine can include metadata for the virtual machine. The physical storage object can include various metadata of the virtual machine (e.g., different attributes, properties, etc. of the virtual machine). For instance, the metadata can include its name, its Universal Unique ID (UUID), size of virtual memory, number of virtual processors, its host or hypervisor, applications that are executing in the virtual machine, virtual devices are associated with each application executing in the virtual machine, etc.

At 208, the virtual plugin 106 transmits a request to the virtual storage manager 108 for all virtual devices identified for the virtual machine identified at 206. As described above, the virtual devices for a virtual machine are included in the metadata for the virtual machine. Therefore, the virtual plugin 106 transmits a request for all virtual devices included in the metadata for the virtual machine. For RDM, the virtual device is of type VirtualDiskRawDeviceMapping. For VMDK, the virtual device is of type VirtualDisk At 209, in response to 208, the virtual storage manager 108 retrieves the physical Logical Unit Numbers (LUN) IDs and disk names for each of the virtual devices identified at 208. The virtual storage manager 108 can use the virtual devices listed in the metadata for the virtual machine and perform a lookup to obtain the LUNs and disks names. For instance, the storage device 173 can include a table that maps the virtual devices to their LUNs and disk names. The virtual storage manager 108 can perform the lookup into the table to determine the LUN IDs and disks names that correspond to each virtual device for the virtual machine.

At 210, the virtual storage manager 108 then returns a map for the virtual machine. The map can include multiple mappings, wherein each mapping maps a virtual device to the physical LUN IDs and the virtual mapping disk names (e.g., the RDM disk name).

Operations at 211-215 are specific for RDM mappings. Therefore, for any VMDK mappings, operations can continue at 216 for creation of virtual disk objects.

At 211, the virtual plugin 106 requests from the virtual storage manager 108 the host system for the virtual machine identified at 206. The host system is the hypervisor that is managing the virtual machine whose application has application data that is being backed up. For the current example being described in reference to FIG. 1, the host system is the hypervisor 102. Identification of the host system can be retrieved from the metadata for the virtual machine.

At 212, in response to 211, the virtual storage manager 108 returns identification of the host system to the virtual plugin 106.

At 213, in response to 212, the virtual plugin 106 requests from the virtual storage manager 108 the LUNs for the host system. For example, the virtual storage manager 108 retrieves a datastore object that corresponds to the host system based in its ID. With reference to FIG. 1, the virtual storage manager 108 retrieves one of the datastore objects 175 from the storage device 173 that corresponds to the host system based in its ID. The datastore object that corresponds to the host system can include metadata for the host system. The datastore object can include various metadata of the host system (e.g., different attributes, properties, etc. of the host system). For instance, the metadata can include its name, its Universal Unique ID (UUID), the different virtual machines being hosted, the LUNs used for data storage, etc. In some embodiments, the LUNs are Small Computer System Interface (SCSI) LUNs.

At 214, in response to the request at 213, the virtual storage manager 108 finds a match for each SCSI LUN ID for the host system with an entry in the map of all LUN IDs returned at 210.

At 215, the virtual storage manager 108 then finds a match between the serial number of each LUN (the LUN serial number) in the host system matched at 214 and each of the LUN IDs provided by the filesystem plugin 124 at 203. This matching is for RDM mappings. In this instance, the virtual storage manager 108 converts each SCSI LUN ID that was matched at 214 to its corresponding LUN serial number. Then, the virtual storage manager 108 finds those LUN serial numbers in the host system that match the LUN IDs provided by the filesystem plugin 124 at 203. As described above, the LUN IDs provided by the filesystem plugin 124 can either represent an RDM mapping or a physical mapping. If a LUN ID represents a physical mapping, the virtual storage manager 108 will not find a LUN serial number in the host system. To illustrate, assume that the filesystem plugin 124 provides six LUN IDs, wherein five of the LUN IDs have RDM mappings and one of the LUN IDs has a physical mapping. The virtual storage manager 108 will only find matches for the five LUN IDs having an RDM mapping. No match is find for the one LUN ID having a physical mapping.

At 216, the virtual storage manager 108 then creates a virtual disk object for each matched LUN serial number from 215. The virtual disk object can include a disk ID, a disk name, and a Boolean variable to denote whether the mapping is RDM or not (e.g., "isRDM"). The virtual storage manager 108 sets the value of the disk ID to the matched serial number. The virtual storage manager 108 sets the disk name to the disk name in the map for the corresponding LUN ID. The virtual storage manager 108 also sets the Boolean variable to true for these LUN serial numbers.

The virtual storage manager 108 also creates a virtual disk object for each VMDK mapping. For VMDK mappings, the virtual storage manager 108 sets the value of the disk ID and disk name to the VMDK ID and disk name returned in response to the request for the virtual devices at 209 (described above). The virtual storage manager 108 also sets the Boolean variable to false for these VMDK mappings. The virtual plugin 106 can also update the virtual disk objects to include the storage topology for each VMDK mapping. In particular, the virtual plugin 106 can update the virtual disk objects to include the volumes and/or LUNs that map to the VMDK.

At 217, the virtual storage manager 108 then returns the virtual disk object(s) to the virtual plugin 106.

At 218, the virtual plugin 106 populates a response to the discover resources request at 204. In particular, the virtual plugin 106 populates the response with the virtual disk objects provided by the virtual storage manager 108 at 217.

At 219, the virtual plugin 106 returns the completed discovery response to the backup manager 104. The backup manager 104 stores the virtual disk objects returned in the discovery completed response. For instance, the backup manager 104 can store the virtual disk objects as metadata for the backup in local storage (not shown in FIG. 1). If a virtual disk object is created and returned by the virtual plugin 106 based on the matching operations at 214-215, the LUN ID is considered to have an RDM mapping. Conversely, if there is no virtual disk object returned by the virtual plugin 106 based on the matching operations at 214-215, the LUN ID is considered to have a physical mapping. To illustrate, return to the example above with the filesystem plugin 124 providing six LUN IDs, wherein five of the LUN IDs have RDM mappings and one of the LUN IDs has a physical mapping, the completed discovery response would only include five virtual disk objects. In this example, the backup manager 104 determines that the one LUN ID from the filesystem plugin 124 that does not have a corresponding virtual disk object. Rather, the backup manager 104 determines that this particular LUN is directly attached to the virtual machine with no attachment to the hypervisor 102. The backup manager 104 can store in the backup metadata for each LUN ID whether the LUN ID is an RDM mapping or is physical mapping. As further described below, this metadata is used as part of the restore of the backup.

A backup can then be performed of the application data. With reference to the example of FIG. 1, the backup manager 104 transmits a request to the storage controller 171 to perform a backup of each of LUN identified by identified by the filesystem plugin 124 (see 203 above). In response, the storage controller 171 creates the backup 162 of the application data 161 in the storage server 110. For example, the backup 162 can be a snapshot of the application data 161.

Example Recovery Workflow

Figure 3:
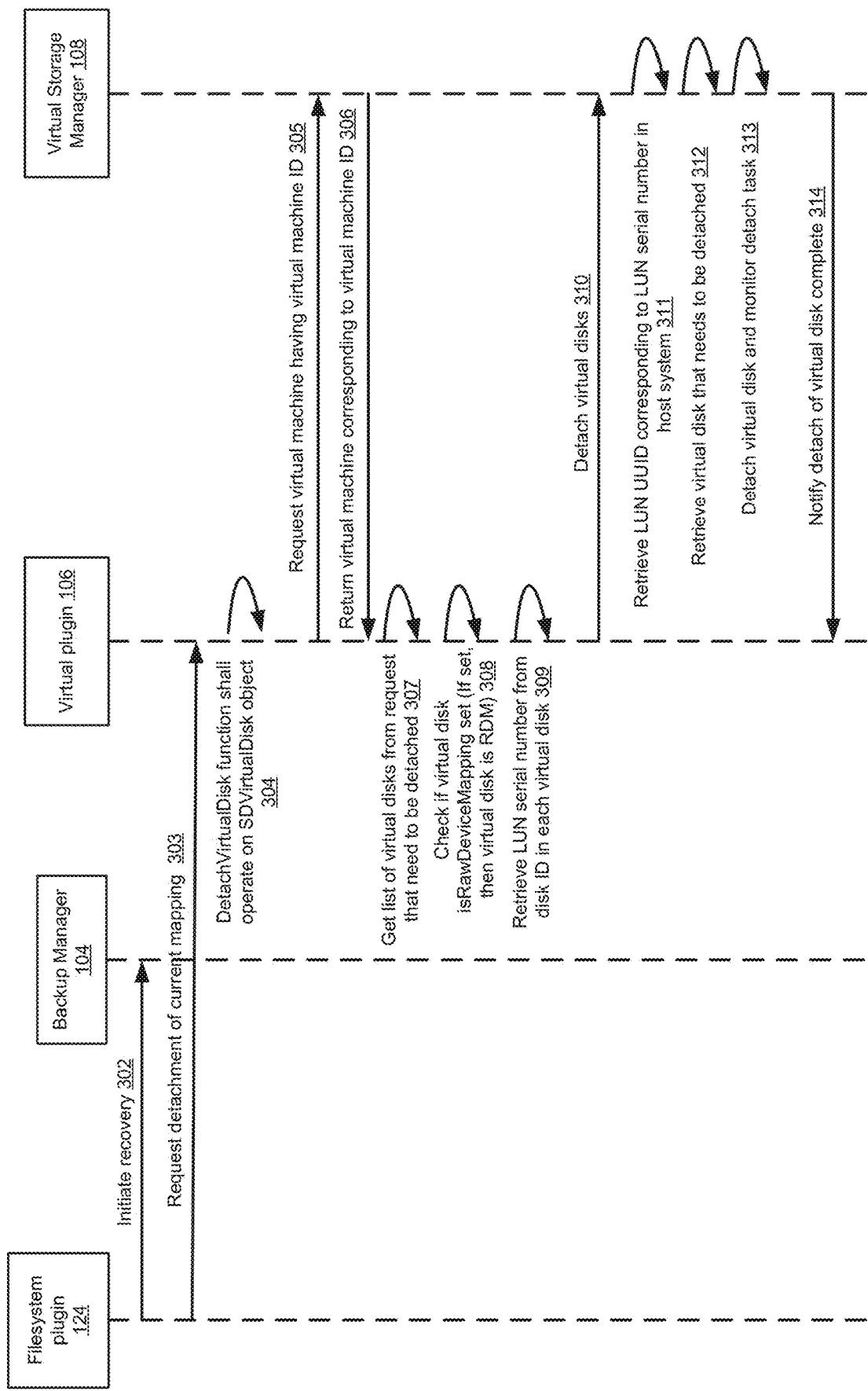
FIGS. 3-4 depict an example workflow diagram for recovery of application data for an application executing in a virtual machine, according to some embodiments.
Figure 4:
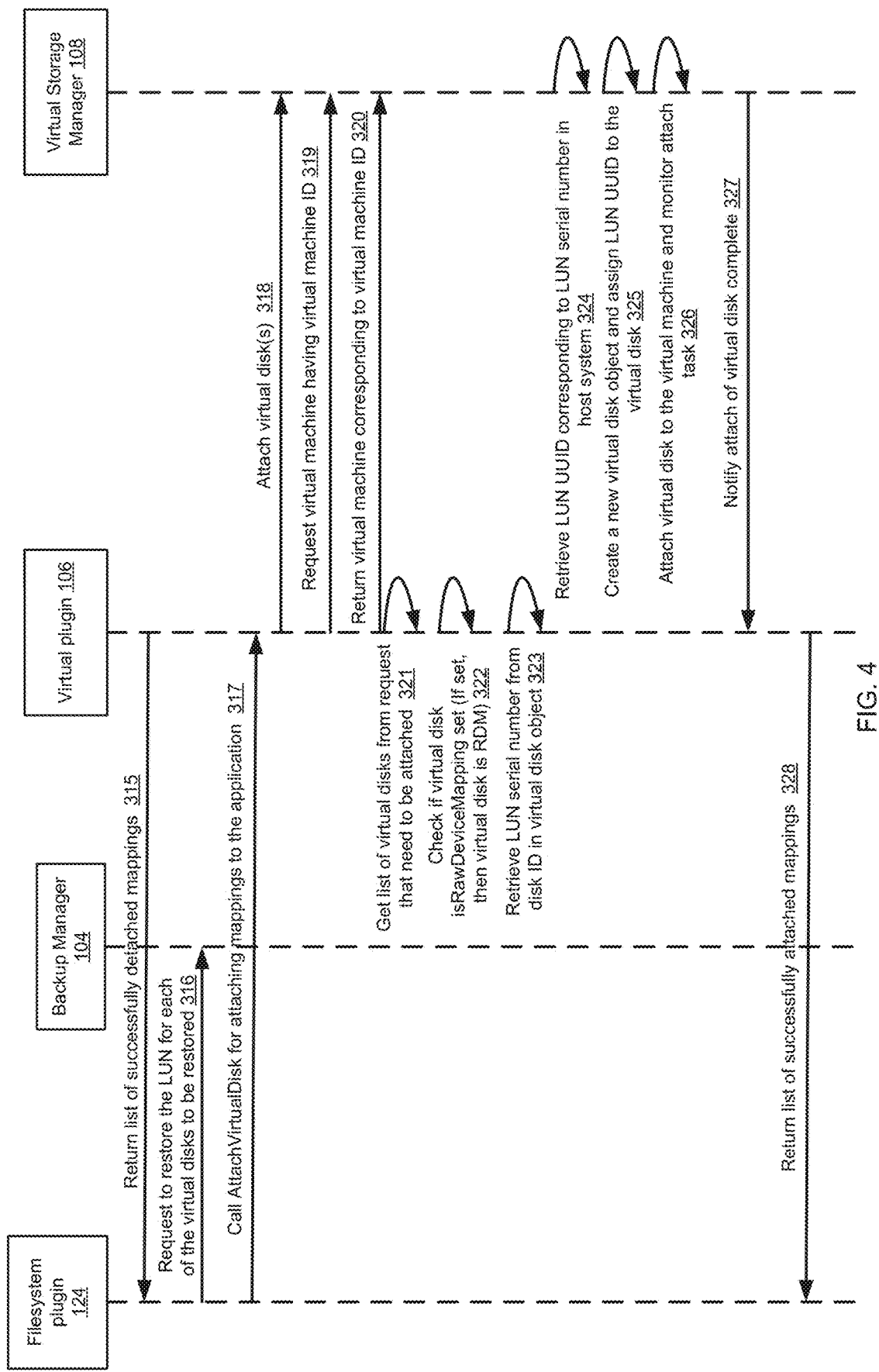

FIGS. 3-4 depict an example workflow diagram for recovery of application data for an application executing in a virtual machine, according to some embodiments. A workflow 300 of FIG. 3 continues in a workflow of FIG. 4. The workflows 300-400 are described with reference to FIG. 1. The workflows 300-400 depict requests, responses, operations, etc. between and within the filesystem plugin 124, the backup manager 104, the virtual plugin 106, and the virtual storage manager 108. Operations of the workflows 300-400 can be performed by software, firmware, hardware or a combination thereof. The operations of the workflow 300 start at 302.

At 302, the filesystem plugin 124 transmits a request to the backup manager 104 to initiate a recovery of the application 120 in the virtual machine 112. The filesystem plugin 124 can issue the request in response to different events or different criteria. For example, a request to initiate recovery can be in response to the application 120 generating an error (such as a read/write error in an attempt to access data from the storage server 110). In another example, a request to initiate recovery can be in response to the application 120 ceasing operations. In another instance, a request to initiate recovery can be in response to a request to restore from the backup manager 104.

At 303, the filesystem plugin 124 also transmits a request to the virtual plugin 106 to detach the current mapping for the application being recovered. The request includes an identification of the virtual machine whose application is being restored. In this example, identification of the virtual machine 112 is included in the request to restore the application 120. Detach of the current mapping is needed prior to restore, because the current mapping may have additional addresses that have been added since the backup was captured. In other words, the previous mapping at the time of the backup would not include the additional addresses in the current mapping. If a detach is not performed, an operating system in the virtual machine 112 would view two different virtual disks (based on the current and previous mappings) for storage of application data for the application 120.

At 304, in response to the detach request at 303, the virtual plugin 106 executes a DetachVirtualDisk function on one or more virtual disk objects. Execution of the DetachVirtualDisk function initiates detachment of the virtual disk object(s) which results in operations performed at 305-314 (described below).

At 305, in response to execution of the DetachVirtualDisk function, the virtual plugin 106 transmits a request to the virtual storage manager 108 for the metadata associated with the virtual machine with the application whose application data is being recovered. The request can include an identification of the virtual machine. The identification of the virtual machine can be an alphanumeric value that uniquely represents the virtual machine among virtual machines having resources that are stored in the storage server 110. The metadata of the virtual machine can include different attributes, properties, etc. of the virtual machine. For instance, the metadata can include its name, its Universal Unique ID (UUID), size of virtual memory, number of virtual processors, its host or hypervisor, applications that are executing in the virtual machine, virtual disks are associated with each application executing in the virtual machine, etc.

At 306, in response to the request at 305, the virtual storage manager 108 transmits the metadata associated with the virtual machine identified in the request 305 back to the virtual plugin 106.

At 307, the virtual plugin 106 parses through the metadata to identify which virtual disk(s) are associated with the application being recovered. Each application can include one or more virtual disks that are used to store data associated with the application. The metadata for the virtual machine includes identification of each virtual disk that is used to store data for the application being recovered. In this example, the virtual plugin 106 determines the identifications of each virtual disk for the application 120.

At 308, the virtual plugin 106 also determines the type of mapping (e.g., RDM, VMDK, etc.) for each virtual disk. The type of mapping for each virtual disk can be included in the metadata for the virtual machine that was provided at 306. For instance, the metadata can include a Boolean variable "IsRawDeviceMapping" for each virtual disk. If RDM mapping was used for mapping from virtual to physical space, this Boolean variable is set to true. If VMDK or other mapping was used, the Boolean variable "IsRawDeviceMapping" can be set to false. More than two types of mappings can be used. In such instances, the metadata for the virtual machine can include a mapping variable that is assigned a value associated with a given mapping. For example, RDM is assigned a value of 101, VMDK is assigned a value of 102, a third mapping is assigned a value of 103, etc. The virtual plugin 106 can then determine the type of mapping based on the value assigned to the mapping variable for a given virtual disk.

At 309, the virtual plugin 106 then uses the identification of the virtual disk to determine the corresponding LUN serial ID or virtual disk ID for each virtual disk. The virtual plugin 106 can determine the corresponding LUN serial ID or virtual disk ID for each virtual disk by retrieving this data from the virtual disk object created at 216 of workflow 200 of FIG. 2 during the backup operations. If the mapping is RDM, the LUN serial ID is retrieved. If the mapping is VMDK, the virtual disk ID is retrieved.

At 310, the virtual plugin 106 transmits a request to the virtual storage manager 108 to detach each of the virtual disks for the application that is being recovered. The request includes the corresponding LUN serial ID for RDM or the corresponding virtual disk ID for VMDK for each of the virtual disks (determined at 309).

At 311, in response to the request at 310, the virtual storage manager 108 retrieves the LUN UUID that corresponds to the LUN serial ID for each of the virtual disks being detached. For example, a table or other data structure can be stored in memory. The table can include entries, wherein each entry includes the LUN serial ID and its corresponding LUN UUID. Accordingly, the virtual storage manager 108 can traverse this table to retrieve the LUN UUID that corresponds to the LUN serial ID for each virtual disk. (RDM specific).

At 312, the virtual storage manager 108 then retrieves the virtual disk(s) that need to be detached based on the LUN UUID. In particular, the virtual storage manager 108 retrieves the metadata for each of the virtual disks.

At 313, the virtual storage manager 108 then detaches the virtual disk(s) and monitors the detach task. In particular, metadata for the virtual disk(s) includes which host or hypervisor is hosting the virtual machine having the application that is associated with the virtual disk(s). The virtual storage manager 108 updates the metadata of the virtual disk(s) to remove the association with the hypervisor 102 that is hosting the virtual machine 112. Additionally, the virtual storage manager 108 updates the metadata of the virtual machine 112 to remove the association with each virtual disk(s) being detached.

The virtual storage manager 108 continues to monitor the detachment of each of the virtual disks until detachment is complete.

At 314, the virtual storage manager 108 transmits a notification to the virtual plugin 106 that the detachment of the virtual disk(s) from the host or hypervisor is complete (assuming that the detach task was successful). If not successful, the virtual storage manager 108 can retry N number of times. If still not successful, the virtual storage manager 108 can instead transmit a notification to the virtual plugin 106 that an error occurred in the detachment. Such an error can result in not continuing the operations depicted in the workflow 400. Instead, the recovery of the application can be aborted. Operations of the workflow 300 continue at the workflow 400 depicted in FIG. 4 (which is now described).

At 315, in response to receive the notification of completion of detachment, the virtual plugin 106 returns a list of the successfully detached mappings (a mapping from each of the virtual disk(s)) to the filesystem plugin 124. With reference to the example of FIG. 1, the virtual machine 112 is no longer aware of any attached mappings. At this stage of the workflows 300-400, the detachment of the virtual disks is complete. Now, the attachment of the virtual disks to restore the application to a previous start can be initiated.

At 316, the filesystem plugin 124 transmits a request to the backup manager 104 to restore each of the virtual disks that were previously backed up as part of the backup of the application (see description above of backup in the workflow 200 depicted in FIG. 2). The backup manager 104 then restores each of the virtual disks. In particular, the backup manager 104 is initiating restoration process for each of the virtual disks, wherein restoration is performed by operations at 317-326 (which are described below).

At 317, the filesystem plugin 124 can then initiate attachment of the virtual disk(s) that were previously copied as part of the backup of the application. In particular, the filesystem plugin 124 can initiate attachment by transmitting a message to the virtual plugin 106 to attach the virtual disk(s). Initiation of attachment results in operations performed at 318-327 (described below). For virtual disks having an RDM mapping, the message includes the LUN serial ID for each virtual disk that needs to be attached and that has been restored by the backup manager 104 (see description of 316 above). For virtual disks having a VMDK mapping, the message includes the virtual disk ID for each virtual disk that needs to be attached and that has been restored by the backup manager 104 (see description of 316 above).

At 318, in response to initiating attachment, the virtual plugin 106 transmit a request to the virtual storage manager 108 to attach virtual disk(s). For example, the virtual plugin 106 can perform an API call to cause the virtual storage manager 108 to attach the virtual disk(s) identified in the message from the filesystem plugin 124. The virtual disks to be attached can include one or more virtual disks having an RDM mapping, one or more virtual disks having a VMDK mapping, or some combination thereof. As described above, the backup manager 104 stores a virtual disk object for each of the virtual disks that are backed up (see description of 219 above). The backup manager 104 can provide the virtual disk object(s) for each of the virtual disks that are to be attached. Attaching of the virtual disks includes associating the virtual disk(s) with the virtual machine. In this example, the virtual storage manager 108 causes the virtual disk(s) to be associated with the virtual machine 112 in the hypervisor 102. The virtual storage manager 108 updates the metadata for each of these virtual disks to associate the virtual disks with the virtual machine 112.

At 319, the virtual plugin 106 also transmits a request to the virtual storage manager 108 for the metadata associated with the virtual machine having the application whose application data is being recovered. The request can include an identification of the virtual machine. As described above, the metadata of the virtual machine can include different attributes, properties, etc. of the virtual machine. For instance, the metadata can include its name, its Universally Unique ID (UUID), size of virtual memory, number of virtual processors, its host or hypervisor, applications that are executing in the virtual machine, virtual disks are associated with each application executing in the virtual machine, etc.

At 320, in response to the request at 319, the virtual storage manager 108 transmits the metadata associated with the virtual machine identified in the request 319 back to the virtual plugin 106.

At 321, the virtual plugin 106 parses through the metadata of the virtual machine to identify which virtual disk(s) are associated with the application being recovered. Each application can include one or more virtual disks that are used to store data associated with the application. The metadata for the virtual machine includes identification of each virtual disk that is used to store data for the application being recovered. In this example, the virtual plugin 106 determines the identifications of each virtual disk for the application 120.

At 322, the virtual plugin 106 also determines the type of mapping (e.g., RDM, VMDK, etc.) for each virtual disk. The type of mapping for each virtual disk can be included in the metadata for the virtual machine that was provided at 320. For instance, the metadata can include a Boolean variable "IsRawDeviceMapping" for each virtual disk. If RDM mapping was used for mapping from virtual to physical space, this Boolean variable is set to true. If VMDK or other mapping was used, the Boolean variable "IsRawDeviceMapping" can be set to false. As described above, more than two types of mappings can be used. In such instances, the metadata for the virtual machine can include a mapping variable that is assigned a value associated with a given mapping.

At 323, the virtual plugin 106 then uses the identification of the virtual disk to determine the corresponding LUN serial ID or virtual disk ID for each virtual disk. The virtual plugin 106 can determine the corresponding LUN serial ID or virtual disk ID for each virtual disk by retrieving this data from the virtual disk object created at 216 of workflow 200 of FIG. 2 during the backup operations. If the mapping is RDM, the LUN serial ID is retrieved. If the mapping is VMDK, the virtual disk ID is retrieved.

At 324, the virtual storage manager 108 retrieves the LUN UUID that corresponds to the LUN serial ID for each of the virtual disks being attached. For example, a table or other data structure can be stored in memory. The table can include entries, wherein each entry includes the LUN serial ID and its corresponding LUN UUID. Accordingly, the virtual storage manager 108 can traverse this table to retrieve the LUN UUID that corresponds to the LUN serial ID for each virtual disk. (RDM specific).

At 325, for each virtual disk being attached, the virtual storage manager 108 creates a new virtual disk object and assigns the LUN UUID to the new virtual disk object.

At 326, the virtual storage manager 108 then attaches the virtual disk(s) and monitors the attach task. In particular, metadata for the virtual disk(s) includes which host or hypervisor is hosting the virtual machine having the application that is associated with the virtual disk(s). The virtual storage manager 108 updates the metadata of the virtual disk(s) to add the association with the hypervisor 102 that is hosting the virtual machine 112 and to add the association with the virtual machine 112. Additionally, the virtual storage manager 108 updates the metadata of the virtual machine 112 to add the association with each virtual disk(s) being attached. The virtual storage manager 108 continues to monitor the attachment of each of the virtual disks until attachment is complete.

At 327, the virtual storage manager 108 transmits a notification to the virtual plugin 106 that the attachment of the virtual disk(s) to the host or hypervisor is complete (assuming that the attach task was successful). If not successful, the virtual storage manager 108 can retry N number of times. If still not successful, the virtual storage manager 108 can instead transmit a notification to the virtual plugin 106 that an error occurred in the attachment. Such an error can result in not continuing the operations depicted in the workflow 400. Instead, the recovery of the application can be aborted.

At 328, in response to receive the notification of completion of attachment, the virtual plugin 106 returns a list of the successfully attached mappings (a mapping from each of the virtual disk(s)) to the filesystem plugin 124. The filesystem for the virtual machine 112 can be restarted. Also, the backup manager 104 can use an application plugin to restart the application 120 over the filesystem based on the restored mappings. The recovery of the application is now complete.

Example Use—Backup as a Clone on a Different Host

In some embodiments, the backup can be restored for operation on a different host. For example, the backup can effectively serve as a clone of the application data. For instance, an application executing in a virtual machine can be running on a production host (e.g., hypervisor). The clone can be used to create an application executing in a virtual machine running on a different host. In some applications, the different host can be used to verify or test the clones. The clone can be independently verified by the application itself prior to using that particular backup for recovery in a production environment. For example, for a database application, verification can include execution of different database utilities to verify proper operations of the database based on the backup. If results of execution of the different database utilities is successful, the backup is marked as verified. Accordingly, a customer or user of the application has a higher level of confidence in the recovery based on a backup that has been verified.

In some other instances, a clone can also be used to enable various groups to test the clone on a different host. For example, developers can be developing application X (version N) on host A. Application testers, quality assurance personnel, audit personnel, etc. can use the clone to test a previous version of the application on a different host (e.g., testing application X (version N−1) on host B. For example, for auditing, different business analytics can be executed on the application to provide auditing test results.

Example Computer Device

Figure 5:
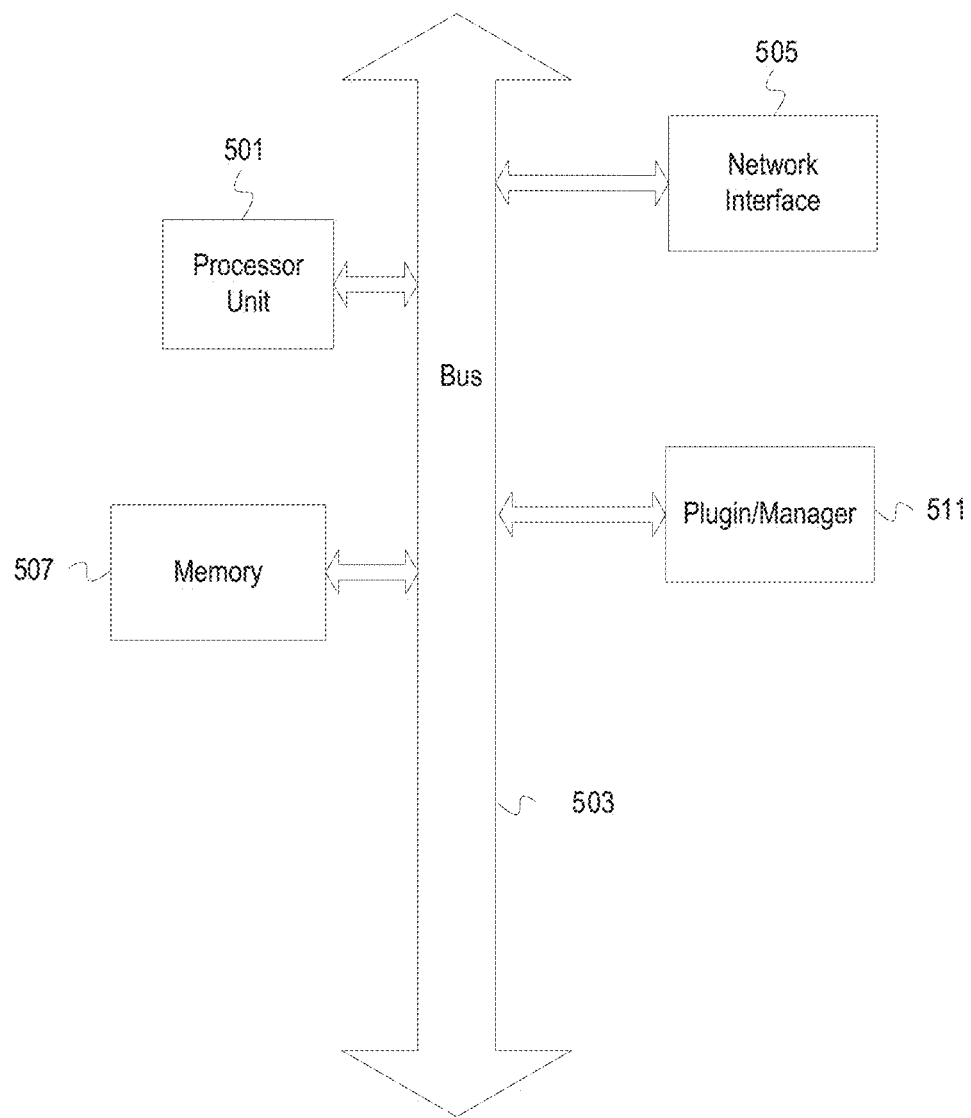
FIG. 5 depicts an example computer device.

FIG. 5 depicts an example computer device for backup and recovery of application data in a virtual machine. The computer device includes a processor 501 (possibly including multiple processors, multiple cores, multiple nodes, and/or implementing multi-threading, etc.). The computer system includes memory 507. The memory 507 may be a system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport® bus, InfiniBand® bus, NuBus, etc.) and a network interface 505 (e.g., a Fiber Channel interface, an Ethernet interface, an internet small computer system interface, SONET interface, wireless interface, etc.). The system communicates via transmissions to and/or from remote devices via the network interface 505 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

The system also includes a plugin/manager 511. The plugin/manager 511 provides functionalities for backup and recovery of application data for applications executing in a virtual machine (as described above). For example, the plugin/manager 511 can represent any one of the filesystem plugin 124, the backup manager 104, the virtual plugin 106, and the virtual storage manager 108 depicted in FIGS. 1-4. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

Variations

The examples often refer to a "manager" (e.g., virtual plugin 106, virtual storage manager 108, etc.). The manager is a construct used to refer to implementation of functionality for backup and recovery. This construct is utilized since numerous implementations are possible. A manager may be a particular component or components of a machine (e.g., a particular circuit card enclosed in a housing with other circuit cards/boards), machine-executable program or programs, firmware, a circuit card with circuitry configured and programmed with firmware for backup and recovery, etc. The term is used to efficiently explain content of the disclosure. Although the examples refer to operations being performed by a manager, different entities can perform different operations. For instance, a dedicated co-processor or application specific integrated circuit can at least of the backup and recovery.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for backup and recovery of application data in a virtual machine as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
   retrieving an identifier used by an application of a virtual machine to store application data in a storage volume;
   in response to receiving a request to initiate a recovery process for the application as a recovered application, identifying a current mapping used by the application to store application data in the storage volume, wherein a backup manager receives the request to initiate the recovery process from a filesystem plugin;
   detaching the current mapping by detaching virtual disks of the virtual machine stored in the storage volume;
   for each virtual disk to be restored by the recovery process:
     identifying a LUN associated with the virtual disk; and
     attaching a new mapping to the recovered application by attaching the virtual disk to the virtual machine, wherein a LUN identifier of the LUN is assigned to the virtual disk; and
   in response to attaching the new mappings to the recovered application, configuring the recovered application to utilize the new mappings for storing the application data within the virtual disks attached to the virtual machine.

2. The method of claim 1, comprising:
   setting values of disk identifiers for the virtual disks to LUN serial numbers matching information provided by the filesystem plugin.

3. The method of claim 1, wherein a virtual plugin initiates detachment of the current mapping in response to receiving a detachment request from the filesystem plugin.

4. The method of claim 3, wherein a virtual storage manager detaches the virtual disks of the virtual machine based upon the virtual plugin initiating the detachment of the current mapping.

5. The method of claim 1, comprising:
   obtaining a list of virtual disks to be detached;
   in response to determining that the virtual disks within the list of virtual disks having a raw device mapping setting, determining that the virtual disks are configured according to a raw disk mapping; and
   retrieving LUN serial numbers from disk identifiers for the virtual disks having the raw disk mapping.

6. The method of claim 1, wherein the detaching the virtual disks comprises:
   retrieving, by a virtual storage manager, LUN identifiers corresponding to LUN serial numbers in a host system, wherein the LUN identifiers are associated with the virtual disks;
   retrieving, by the virtual storage manager, the virtual disks to be detached;
   implementing, by the virtual storage manager, a detachment task to detach the virtual disks;
   monitoring, by the virtual storage manager, the detachment task; and
   notifying, by the virtual storage manager, a virtual plugin that the detachment tasks has completed.

7. The method of claim 6, comprising:
   in response to the filesystem plugin receiving a list of successfully detached mappings from the virtual plugin, transmitting a LUN restore request to the backup manager to restore LUNs for the virtual disks to be restored.

8. A computing device comprising:
   a memory comprising machine executable code; and
   a processor coupled to the memory, the processor configured to execute the machine executable code to cause the computing device to implement:
     a filesystem plugin configured to generate a request to initiate a recovery process for an application of a virtual machine as a recovered application;
     a backup manager configured to initiate mapping detachment operation in response to the request;
     a virtual plugin configured to initiate a detachment of a current mapping used by the application to store application in a storage volume in response to the backup manager initiating the mapping detachment operation; and a virtual storage manager configured to
for each virtual disk to be restored by the recovery process:
identifying a LUN associated with the virtual disk; and
attaching a new mapping to the recovered application by attaching the virtual disk to the virtual machine, wherein a LUN identifier of the LUN is assigned to the virtual disk; and
in response to attaching the new mappings to the recovered application, configuring the recovered application to utilize the new mappings for storing application data within the virtual disks attached to the virtual machine.

9. The computing device of claim 8, wherein the virtual plugin is configured to:
obtain a list of virtual disks to be detached;
in response to determining that the virtual disks within the list of virtual disks have a raw device mapping setting, determine that the virtual disks are configured according to a raw disk mapping; and
retrieve LUN serial numbers from disk identifiers for the virtual disks.

10. The computing device of claim 8, wherein the virtual storage manager is configured to:
retrieve LUN identifiers corresponding to LUN serial numbers in a host system, wherein the LUN identifiers are associated with the virtual disks;
retrieve the virtual disks to be detached;
implement a detachment task to detach the virtual disks;
monitor the detachment task; and
notify the virtual plugin that the detachment tasks has completed.

11. The computing device of claim 10, wherein the virtual storage manager is configured to:
in response to the filesystem plugin receiving a list of successfully detached mappings from the virtual plugin, transmit LUN restore request to the backup manager to restore LUNs for the virtual disks to be restored.

12. The computing device of claim 8, wherein the virtual plugin is configured to:
obtain a list of virtual disks to be attached;
in response to determining that the virtual disks within the list of virtual disks having a raw device mapping setting, determine that the virtual disks are configured according to a raw disk mapping; and
retrieve LUN serial numbers from disk identifiers for the virtual disks having the raw disk mapping.

13. The computing device of claim 8, wherein the filesystem plugin is configured to:
transmit an attach virtual disk call to the virtual plugin for attaching mappings to the application.

14. A non-transitory machine readable medium having stored thereon machine executable code which when executed by a machine, causes the machine to:
retrieve an identifier used by an application of a virtual machine to store application data in a storage volume;
in response to receiving a request to initiate a recovery process for the application as a recovered application, identify a current mapping used by the application to store application data in the storage volume;
in response to determining that virtual disks within a list of virtual disks to detach as part of the recovery process have a raw device mapping setting corresponding to a raw disk mapping, retrieve LUN serial numbers from disk identifiers for the virtual disks having the raw disk mapping;
detach the current mapping by detaching virtual disks of the virtual machine stored in the storage volume;
for each virtual disk to be restored by the recovery process:
identify a LUN associated with the virtual disk based upon a LUN serial number of the LUN serial numbers; and
attach a new mapping to the recovered application by attaching the virtual disk to the virtual machine, wherein a LUN identifier of the LUN is assigned to the virtual disk; and
in response to attaching the new mappings to the recovered application, configure the recovered application to utilize the new mappings for storing the application data within the virtual disks attached to the virtual machine.

15. The non-transitory machine readable medium of claim 14, wherein a backup manager receives the request to initiate the recovery process from a filesystem plugin.

16. The non-transitory machine readable medium of claim 15, wherein a virtual plugin initiates detachment of the current mapping in response to receiving a detachment request from the filesystem plugin.

17. The non-transitory machine readable medium of claim 16, wherein a virtual storage manager detaches the virtual disks of the virtual machine based upon the virtual plugin initiating the detachment of the current mapping.

18. The non-transitory machine readable medium of claim 14, wherein the machine executable code causes the machine to:
in response to receiving a detachment request, initiating a detachment of the current mapping and detaching the virtual disks of the virtual machine.

19. The non-transitory machine readable medium of claim 14, wherein the machine executable code causes the machine to:
retrieve, by a virtual storage manager, LUN identifiers corresponding to the LUN serial numbers in a host system, wherein the LUN identifiers are associated with the virtual disks;
retrieve, by the virtual storage manager, the virtual disks to be detached;
implement, by the virtual storage manager, a detachment task to detach the virtual disks;
monitor, by the virtual storage manager, the detachment task; and
notify, by the virtual storage manager, a virtual plugin that the detachment tasks has completed.

20. The non-transitory machine readable medium of claim 19, wherein the machine executable code causes the machine to:
in response to a filesystem plugin receiving a list of successfully detached mappings from the virtual plugin, transmit a LUN restore request to a backup manager to restore LUNs for the virtual disks to be restored.

21. A method, comprising:
retrieving an identifier used by an application of a virtual machine to store application data in a storage volume;
in response to receiving a request to initiate a recovery process for the application as a recovered application, identifying a current mapping used by the application to store application data in the storage volume;

detaching the current mapping by detaching virtual disks
of the virtual machine stored in the storage volume,
wherein the detaching comprises:
retrieving, by a virtual storage manager, the virtual
disks to be detached and LUN identifiers associated
with the virtual disks and corresponding to LUN
serial numbers in a host system;
implementing and monitoring, by the virtual storage
manager, a detachment task to detach the virtual
disks; and
notifying, by the virtual storage manager, a virtual
plugin that the detachment tasks has completed;
for each virtual disk to be restored by the recovery
process:
identifying a LUN associated with the virtual disk; and
attaching a new mapping to the recovered application
by attaching the virtual disk to the virtual machine,
wherein a LUN identifier of the LUN is assigned to
the virtual disk; and
in response to attaching the new mappings to the recovered application, configuring the recovered application
to utilize the new mappings for storing the application
data within the virtual disks attached to the virtual
machine.

22. The method of claim 21, comprising:
in response to a filesystem plugin receiving a list of
successfully detached mappings from the virtual
plugin, transmitting a LUN restore request to a backup
manager to restore LUNs for the virtual disks to be
restored.

23. The method of claim 21, comprising:
receiving, by a backup manager, the request to initiate the
recovery process from a file system plugin.

24. The method of claim 21, comprising:
initiating, by the virtual plugin, detachment of the current
mapping in response to receiving a detachment request
from a filesystem plugin.

25. A method comprising:
retrieving an identifier used by an application of a virtual
machine to store application data in a storage volume;
in response to receiving a request to initiate a recovery
process for the application as a recovered application,
identifying a current mapping used by the application
to store application data in the storage volume;
in response to determining that virtual disks within a list
of virtual disks to detach as part of the recovery process
have a raw device mapping setting corresponding to a
raw disk mapping, retrieve LUN serial numbers from
disk identifiers for the virtual disks having the raw disk
mapping;
detaching the current mapping by detaching virtual disks
of the virtual machine stored in the storage volume;
for each virtual disk to be restored by the recovery
process:
identifying a LUN associated with the virtual disk
based upon a LUN serial number of the LUN serial
numbers; and
attaching a new mapping to the recovered application
by attaching the virtual disk to the virtual machine,
wherein a LUN identifier of the LUN is assigned to
the virtual disk; and
in response to attaching the new mappings to the recovered application, configuring the recovered application
to utilize the new mappings for storing the application
data within the virtual disks attached to the virtual
machine.

26. The method of claim 25, comprising:
in response to a filesystem plugin receiving a list of
successfully detached mappings from a virtual plugin,
transmitting a LUN restore request to a backup manager to restore LUNs for the virtual disks to be restored.

27. The method of claim 25, wherein a backup manager
receives the request to initiate the recovery process from a
filesystem plugin.

28. The method of claim 27, wherein a virtual plugin
initiates detachment of the current mapping in response to
receiving a detachment request from the filesystem plugin.

29. The method of claim 28, wherein a virtual storage
manager detaches the virtual disks of the virtual machine
based upon the virtual plugin initiating the detachment of the
current mapping.

30. The method of claim 25, comprising:
retrieve, by a virtual storage manager, LUN identifiers
corresponding to LUN serial numbers in a host system,
wherein the LUN identifiers are associated with the
virtual disks;
retrieve, by the virtual storage manager, the virtual disks
to be detached;
implement, by the virtual storage manager, a detachment
task to detach the virtual disks;
monitor, by the virtual storage manager, the detachment
task; and
notify, by the virtual storage manager, a virtual plugin that
the detachment tasks has completed.

31. The method of claim 30, comprising:
in response to a filesystem plugin receiving a list of
successfully detached mappings from the virtual
plugin, transmit a LUN restore request to a backup
manager to restore LUNs for the virtual disks to be
restored.

32. A computing device comprising:
a memory comprising instructions; and
a processor coupled to the memory, the processor configured to execute the instructions to perform operations including:
retrieving an identifier used by an application of a
virtual machine to store application data in a storage
volume;
in response to receiving a request to initiate a recovery
process for the application as a recovered application, identifying a current mapping used by the
application to store application data in the storage
volume, wherein a backup manager receives the
request to initiate the recovery process from a filesystem plugin;
detaching the current mapping by detaching virtual
disks of the virtual machine stored in the storage
volume;
for each virtual disk to be restored by the recovery
process:
identifying a LUN associated with the virtual disk;
and
attaching a new mapping to the recovered application by attaching the virtual disk to the virtual
machine, wherein a LUN identifier of the LUN is
assigned to the virtual disk; and
in response to attaching the new mappings to the
recovered application, configuring the recovered
application to utilize the new mappings for storing
the application data within the virtual disks attached
to the virtual machine.

33. The computing device of claim 32, wherein a virtual plugin initiates detachment of the current mapping in response to receiving a detachment request from the filesystem plugin.

34. The computing device of claim 33, wherein a virtual storage manager detaches the virtual disks of the virtual machine based upon the virtual plugin initiating the detachment of the current mapping.

35. The computing device of claim 32, wherein the operations comprise:

obtaining a list of virtual disks to be detached;

in response to determining that the virtual disks within the list of virtual disks having a raw device mapping setting, determining that the virtual disks are configured according to a raw disk mapping; and retrieving LUN serial numbers from disk identifiers for the virtual disks having the raw disk mapping.

36. The computing device of claim 32, wherein the detaching the virtual disks comprises:

retrieving, by a virtual storage manager, LUN identifiers corresponding to LUN serial numbers in a host system, wherein the LUN identifiers are associated with the virtual disks;

retrieving, by the virtual storage manager, the virtual disks to be detached;

implementing, by the virtual storage manager, a detachment task to detach the virtual disks;

monitoring, by the virtual storage manager, the detachment task; and notifying, by the virtual storage manager, a virtual plugin that the detachment tasks has completed.

37. The computing device of claim 36, wherein the operations comprise:

in response to the filesystem plugin receiving a list of successfully detached mappings from the virtual plugin, transmitting a LUN restore request to the backup manager to restore LUNs for the virtual disks to be restored.

* * * * *